W. H. COLLIER.
STARTER, LIGHTS, AND ALARM CONTROL DEVICE FOR AUTOMOBILES, &c.
APPLICATION FILED APR. 23, 1917.
1,388,933.
Patented Aug. 30, 1921.
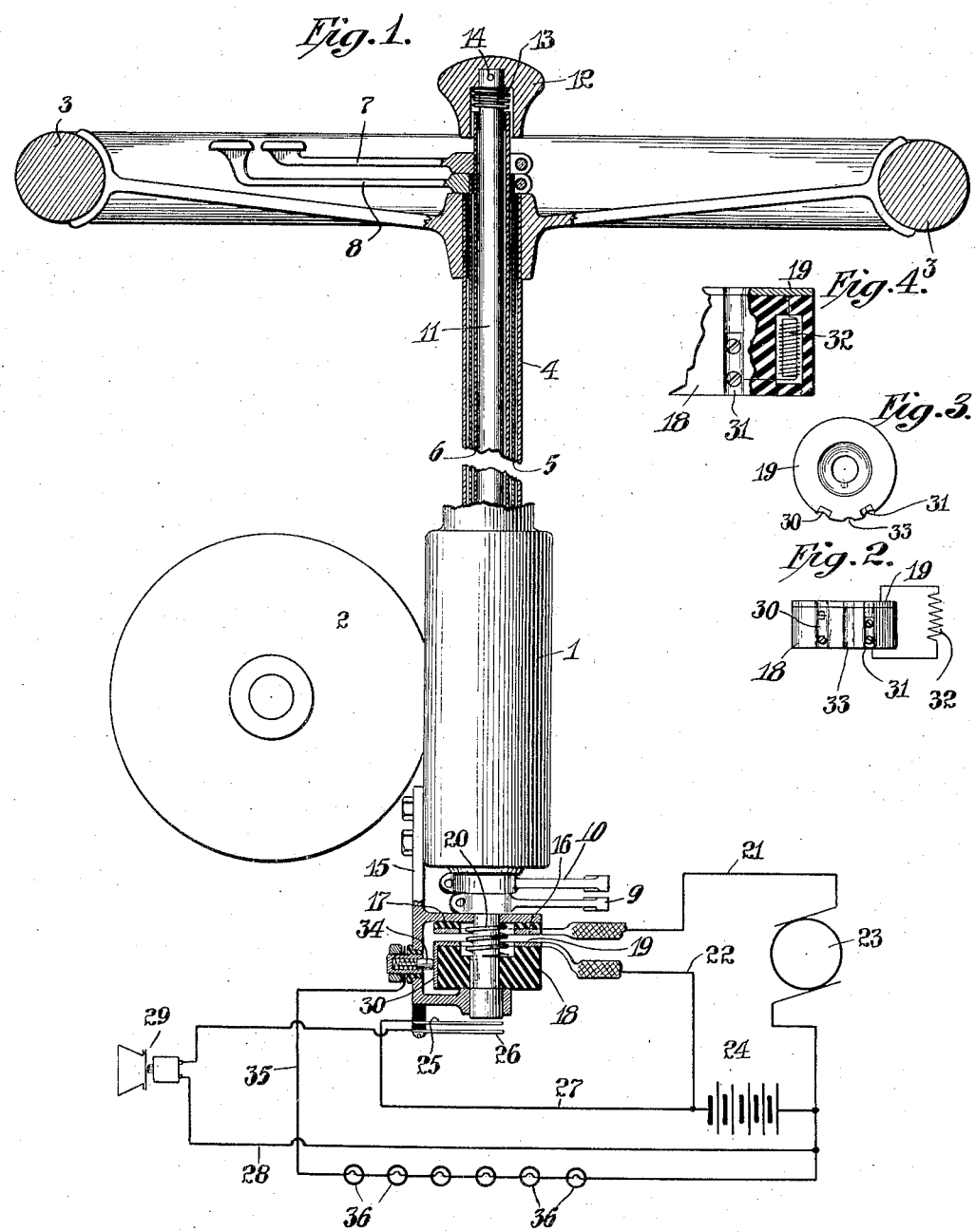

UNITED STATES PATENT OFFICE.

WILLIAM H. COLLIER, OF SANDUSKY, OHIO.

STARTER, LIGHTS, AND ALARM CONTROL DEVICE FOR AUTOMOBILES, &c.

1,388,933. Specification of Letters Patent. Patented Aug. 30, 1921.

Application filed April 23, 1917. Serial No. 163,801.

*To all whom it may concern:*

Be it known that I, WILLIAM H. COLLIER, a citizen of the United States of America, and a resident of Sandusky, Erie county, State of Ohio, have invented a Starter, Lights, and Alarm Control Device for Automobiles, &c., of which the following is a specification.

My invention relates to means, such as a switching device for controlling the action of the starter motor, the lights, and the horn or other alarm device of motor vehicles, motor boats, etc., and comprises novel and improved means whereby certain of the said devices, viz., starter motor and lights, may be operated, or their operation stopped, simultaneously or individually, and at the will of the operator; the said control device being further adapted to be located on the steering post of the vehicle. My invention consists in the novel arrangement of the control device, and in other features hereinafter described and particularly pointed out in the patent claims.

The object of my invention is to simplify control devices of the class referred to and to adapt same for mounting on the steering post or associated members of the steering gear of an automobile, or motor boat, or the like, and to make the selective or joint operation of certain of the controlled devices a simple matter; also to make the controlling device relatively simple and inexpensive.

I will now proceed to describe my invention with reference to the accompanying drawing in which—

Figure 1 shows an elevation and partial section of a typical automobile steering gear with my device applied thereto.

Fig. 2 is an elevation and partial diagrammatical view of one of the contact members of my device.

Fig. 3 shows a detail top view and partial horizontal section of the contact member shown in Fig. 2.

Fig. 4 is a detail fragmentary section of the contact member shown in Figs. 2 and 3, indicating the location of the dimming resistance within that contact member.

In the drawing numerals 1 and 2 designate housings of the steering gear, the details of which and of the steering gear itself form no portion of my present invention and hence are not illustrated fully.

3 designates the ordinary steering wheel, the motion of which is communicated through a hollow shaft 4 to the mechanism of the steering gear in the ordinary manner. As usual, within this hollow shaft 4 are other hollow shafts 5 and 6, connected to hand levers 7 and 8, whereby, and by the corresponding levers 9 and 10 below casing 1, the usual spark adjusting mechanism and throttle valve of the engine may be regulated.

Within shaft 6, and movable freely with respect thereto, is a rod 11; and at the upper end of this rod there is a knob 12, whereby the rod 11 may be oscillated or may be moved either up or down, as desired; the three possible motions of this rod (rotation, upward movement from normal position and downward movement from normal position) constituting the movements necessary for the operation for the various contact devices. Within the knob 12 there is a spring 13, tending to raise the knob to the normal position when it has been pressed down. The knob is connected to rod 11 by a pin 14 to insure that said rod shall follow movements of the knob.

There is a bracket 15 secured to the casing 1 of the steering gear and to this bracket an annular contact disk 16 is secured, such disk, however, being insulated from the bracket 15 by insulation 17.

A disk 18 of insulation material is keyed to the rod 11, below disk 16, and in such manner that rod 11 may move axially without movement of the disk 18; and this disk 18 carries an annular conductive disk 19. A spring 20 between disk 18 and the bracket 15, tends to return the rod 11 to normal position when it is raised above such normal position.

Conductive disks 16 and 19 are connected to the current leads 21 and 22 of the starter circuit; 23 designating the starter and 24 the battery by which current is supplied to the starter. It will be apparent that by raising the knob 12 above normal position this starter circuit is closed, and that by releasing the knob 12 so that the spring 20 may separate conductive disks 16 and 19, the starter circuit is broken.

Beneath the lower end of the rod 11 there are contact springs, 25 and 26, connected in the circuit 27—28 leading from the battery 24 to the alarm device 29; and it will be apparent that by depressing the knob 12 and rod 11 below the normal position of such parts the contact springs 25 and 26 will be brought together and the circuit of the alarm device 29 closed; and that upon release of the knob 12, the spring 13 will return such knob to normal position, so breaking the alarm device circuit.

The conductive disk is provided with an extension 30, extending down the side of the said disk, in a suitable groove of the disk. Said disk also has another contact member 31, connected to disk 19 through resistance 32, as indicated in Fig. 2; both of these contact members, 30 and 31 being grooved, as indicated particularly in Fig. 3; and between these contact members, 30 and 31, there is an intermediate groove 33. A spring-actuated contact plunger 34 is carried by bracket 15, and is adapted to make contact with either contact member 30 or 31, or to lie within the groove 33, according to the position of the disk 18, as determined by rotation of the knob 12. The fact that the contact members, 30 and 31 are grooved, causes the plunger 34 to tend to hold the disk 18 stationary against rotation, while permitting rotation of such disk when the knob 12 is turned, and this plunger 34 also exercises the same retaining action when seated in the groove 33 of disk 18.

The contact plunger 34 is electrically connected to a circuit lead 35, leading through the various lights 36 of the vehicle to one side of the battery 24; and when said plunger is in contact with contact member 30, said battery circuit is closed through the lights 36 without resistance other than that of the various connections and circuit leads; while when said contact plunger 34 is in contact with the contact member 31, the lighting circuit is completed through the resistance 32, which is a "dimming" resistance. In practice the resistance 32 will be located within a suitable recess of the disk 18, as shown in Fig. 4, but for convenience of illustration, such resistance is shown in Fig. 2 external to the disk.

It will be apparent from the foregoing that when the knob 12 is raised from normal position, the starter circuit is closed, and is broken when that knob 12 is returned to normal position; that when knob 12 is depressed from normal position, contact springs 25 and 26 are brought together with the resulting closing of the circuit of the alarm device 29, which circuit is broken upon return of knob 12 to normal position; and that when knob 12 is in intermediate position, with respect to rotation, the lighting circuit is open, but when the knob is rotated in one direction from such normal intermediate position, the lighting circuit is closed without inclusion of dimming resistance; while when said knob is turned in the other direction, the lighting circuit is closed with inclusion of dimming resistance.

It will be apparent that the lighting circuit may be operated as desired, with or without operation of the alarm circuit, or when the alarm circuit is closed; and that the starter circuit may be closed whether the lighting circuit be closed or not. It is not ordinarily required to be able to operate the starter circuit and the alarm circuit simultaneously, and so no provision for doing this is made in the device illustrated.

While I have indicated particular constructions of switches in the drawings, it is to be understood that I am not limiting myself to any particular type of switch or switch-terminal; my invention, in a broad sense, comprising switch means, one operated by rotative motion of the control rod 11, another operated by axial movement of that control rod in one sense from an intermediate position, (the term "sense" being used here in a manner analogous to its use in mathematics), and a third switch arranged to be operated by movement of said control rod 11 in another sense toward or from the normal position of that rod.

What I claim is:

1. In a control device, the combination with the steering post of an automobile, or the like, of a control rod within that post adapted for motion in two directions from a normal position, switch means operated by axial motion of said rod in one sense from or toward said intermediate position, and other switch means operated by axial motion of said rod in the opposite sense toward or from such intermediate position and a starter motor and source of current supply therefor connected to one of said switch means.

2. In a control device, the combination with the steering post of an automobile, of a control rod within that post adapted for both axial and rotary motion, and adapted for axial motion in opposite senses toward and from a normal position, switch means operated by rotary motion of said control rod, and other switch means operated by axial motion of the rod in opposite senses toward or from said intermediate position.

3. In a control device, the combination with the steering post of an automobile, or the like, of a control rod within that post adapted for axial motion in opposite senses from an intermediate position, opposing spring means tending to hold said rod in its intermediate position, and to return it thereto when said rod has been moved in either sense from such intermediate position, switch means operated by movement of said rod in one sense from or toward such intermediate position, and other switch means operated by movement of said rod in the opposite sense toward or from such intermediate position.

4. In a control device, the combination with the steering post of an automobile, or the like, of a control rod within that post, adapted for both axial and rotary motion, switch means operated by axial motion of such rod, comprising two disks, one axially movable with said rod, the other independently supported, said contact disks adapted to make contact one with the other, in any rotative position of said rod, and one of said disks being rotatively movable with said rod, but permitting a limited axial movement of the rod therethrough and provided on its side with a contact member, and a further contact member adapted to make and break contact with such first mentioned contact member, when its disk is rotated.

5. In a control device, the combination with the steering post of an automobile, or the like, of a control rod within that post adapted for both axial and rotary motion, switch means operated by axial motion of such rod, comprising two disks, one axially movable with said rod, the other independently supported, said contact disks adapted to make contact one with the other, in the event of axial movement of said rod in one direction, and one of said disks being rotatively movable with said rod but permitting a limited axial movement of the rod therethrough, and provided on its side with a contact member electrically connected to the contact face of the corresponding disk, and a further contact member adapted to make and break contact with such side contact member upon rotation of said rod and disk.

6. In a control device, the combination with the steering post of an automobile, or the like, of a control rod within that post adapted for both axial and rotary motion, switch means operated by axial motion of such rod, comprising two disks, one axially movable with said rod, the other independently supported, said contact disks adapted to make contact one with the other, in the event of axial movement of said rod in one direction, and one of said disks being rotatively movable with said rod, and provided on its side with two contact members electrically connected with the contact face of such disk, resistance interposed between one of said side contact members and the contact face of such disk, and a further contact member adapted to make and break contact with one or the other of said first mentioned contact members, upon rotation of the disk carrying such contact members.

7. In a control device, the combination with the steering post of an automobile, or the like, of a control rod within that post, adapted for both axial and rotary motion, switch means operated by axial motion of such rod in one sense from a neutral position, comprising two disks, one axially movable with said rod, the other independently supported, other switch means adapted to be operated by motion of said rod in the opposite sense from its neutral position, and comprising contact members adapted to be brought together by such motion of the control rod, and further switch means adapted to be operated by rotation of said rod, and comprising a contact member on the side of one of such disks, such disk arranged to rotate with said rod, and a further contact member arranged to make and break contact with such side contact member of such disk, upon rotation of the disk.

8. In a starter, and light-control device for automobiles and the like, the combination with the steering post of an automobile, or the like, of a control rod within that post adapted for both axial and rotary motion, two conductive disks, one mounted to be moved axially by and also to be rotated by said control rod, the other disk independently supported, said disks arranged to be brought into contact, one with the other, by axial motion of the rod, and to contact, one with the other, in various rotative positions of said rod, a starter motor and source of current supply therefor connected to said disks, that disk which is connected to move with the rod being provided also with a contact segment, a contact member adapted to make contact with such segment in one position of such disk, and a lighting circuit connected to such last mentioned contact member, and, also, to the corresponding contact segment.

In testimony whereof I have signed this specification in the presence of two subscribing witnesses.

WILLIAM H. COLLIER.

Witnesses:
W. C. TUCKER,
JNO. TRAIN.